May 14, 1929.  A. A. GRUNDMARK  1,713,486
TIRE SPREADER
Filed Feb. 24, 1927
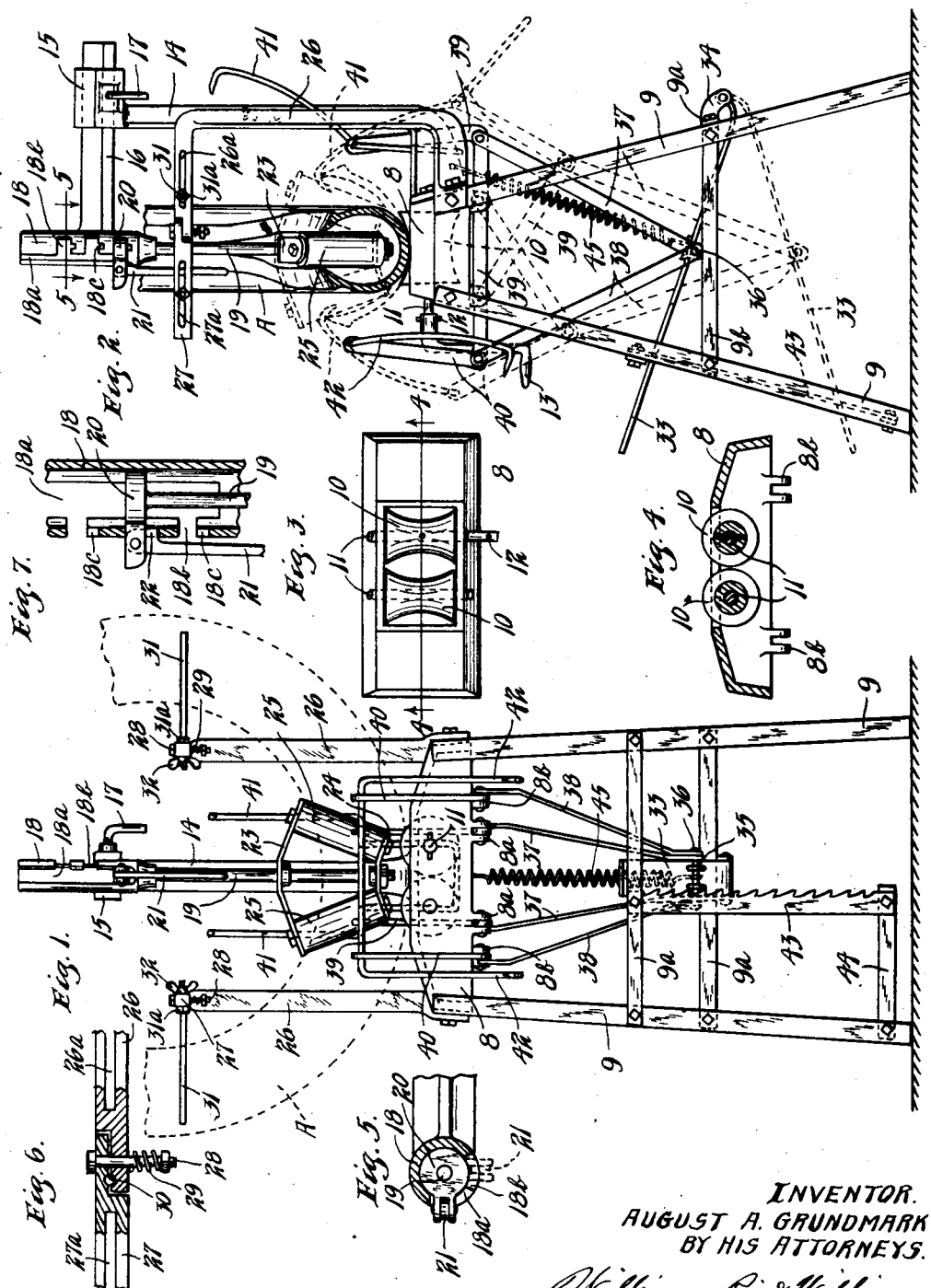
INVENTOR.
AUGUST A. GRUNDMARK.
BY HIS ATTORNEYS.

Patented May 14, 1929.

1,713,488

UNITED STATES PATENT OFFICE.

AUGUST A. GRUNDMARK, OF MINNEAPOLIS, MINNESOTA.

TIRE SPREADER.

Application filed February 24, 1927. Serial No. 170,556.

This invention relates to tire spreaders.

It is an object of this invention to provide an improved tire spreader which can be used to spread a tire casing so that the inside of all parts of the casing can be inspected, and it is a further object to provide, in combination with such a device, means for holding the tire casing in spread relation so that the same can be readily repaired when so held or otherwise worked on.

To these ends the invention consists of the novel parts and novel combinations of parts hereinafter defined in the claims and described in the following specification made in connection with the accompanying drawings, wherein like reference characters refer to the same or similar parts throughout the various views, and, in which, Fig. 1 is a view in front elevation of the preferred embodiment of the invention;

Fig. 2 is a view in end elevation of the device illustrated in Fig. 1, certain of the parts being shown in full lines in one position and in dotted lines in another position;

Fig. 3 is a plan view of the stand with certain of the parts removed;

Fig. 4 is a vertical section taken on the line 4—4 of Fig. 3, as indicated by the arrows;

Fig. 5 is a horizontal section taken on the line 5—5 of Fig. 2, as indicated by the arrows, certain of the parts being shown in full lines in one position and in dotted lines in another position;

Fig. 6 is a view in side elevation of the guide pin supporting arms, certain of the parts being broken away and portions thereof being shown in section, and Fig. 7 is a vertical section taken through the shaft holding head showing the shaft holding arm and its pivoted lever swung to extreme right hand position as viewed in Fig. 2 and locked with the shaft holding head.

Referring to the drawings, a stand is illustrated including the hollow top casing 8 and the angle bar legs 9, secured at each corner of the casing 8 and extending downwardly therefrom. The said legs 9 are preferably spread a greater distance apart at their lower ends than at their upper ends, so as to form a stable support for casing 8. Side brace bars 9ª and end brace bars 9ᵇ are provided extending between the various legs to form a rigid structure. Casing 8 has a top flat central portion, the ends of the top of the casing being downwardly inclined from the flat central portion thereof. The flat central portion of the top of the casing 8 is open and has upwardly projecting rollers 10 therein, the said rollers being secured to shafts 11 journaled in the upper sides of the casing 8. One of the shafts 11 preferably extends outwardly from the front side of the casing a short distance and has a pin 12 extending therethrough with which a crank 13 is adapted to be engaged for rotation of the roller 10 secured to the shaft. The rollers 10 are preferably of the cylindrical concave type.

Secured centrally to the rear side of the casing 8 is a supporting arm 14. The said arm 14 preferably extends rearwardly from the casing and then upwardly a considerable distance above the top of the casing and has a hollow head 15 formed at its upper end. A horizontally disposed T-bar 16 fits within the hollowed out portion of the head 15 and is slidable within the head both forwardly and rearwardly, the said bar being adapted to be secured in any position by a clamp 17 of any common type of construction fitted in the head 15 and adapted to engage with one side of the bar 16. A hollow cylindrical head 18 is formed integral with, or is secured to the forward end of the bar 16. The said cylindrical head has a vertical slot 18ª at its forward side extending into the hollowed out portion from the top of the head downwardly to a short distance from the bottom end thereof. At one side of the slot 18ª, the right side as viewed in Fig. 2 of the drawings, a plurality of vertically spaced notches 18ᵇ are cut in the cylindrical head 18. These notches 18ᵇ communicate with the slot 18ª and have formed centrally on their lower edges the small downwardly extending notches 18ᶜ. The upper end of the cylindrical head 18 has a smooth surface except for the slot 18ª.

A downwardly projecting shaft 19 is journaled in the lower end of the cylindrical head 18 and is secured at its upper end to a short arm 20, the said arm being of a width approximately equaling the width of the slot 18ª and being of a height approximately equaling the height of the various notches 18ᵇ. A lever 21 has a forked portion embracing the short arm 20 and pivoted thereto closely adjacent the cylindrical head 18. Upward pivotal movement of the said lever 21 is limited by the angularly formed outer end of the arm 20. The said lever 21 carries a small projecting tongue 22 at the inner side of its upper end adjacent the arm 20. This tongue 22 is of such size that when the lever 21 is raised to a horizontal position and the arm 20 is swung into one of the slots 18ᵇ and the lever 21 is downwardly swung, the tongue 22 will project into a small notch 18ᶜ to securely lock the shaft 19 from turning movement.

Secured adjacent the lower end of the shaft 19 are the spaced bearing plates 23 and 24. Each of these plates has a central substantially horizontally extending portion secured to the shaft 19 and outwardly and downwardly extending portions at either end of its horizontally extending portion. The upper plate 23 is of greater length than the plate 24. Journaled at opposite sides of the shaft 19 in the two bearing plates 23 and 24 are the cylindrical rollers 25. These rollers are journaled in the downwardly bent end portions of the plates 23 and 24 and, accordingly, the rollers are disposed in substantially V formation.

At the rear side of either end of the casing 8, a supporting arm 26 is secured. Each arm 26 projects first rearwardly from the casing then upwardly and then forwardly, the forward upper end of the supporting arm forming the lower portion of a half-lap joint, the corners of which are rounded. A short arm 27 having one end forming the upper portion of a half-lap joint is pivoted to the half-lap joint portion of the supporting arm 26 by a bolt 28, the said bolt having a short spring 29 about the same and reacting between the lower side of the half-lap portion of the supporting arm 26 and the nut of the bolt. Small co-operating recesses are formed in the adjacent half-lap portions of each arm 26 and its co-operating arm 27 within which a small ball 30 is held, the said ball being adapted to fit within the co-operating recesses when the arm 27 is held straight forwardly in alinement with the upper forwardly extending portion of a supporting arm 26. Horizontally extending slots 26ᵃ and 27ᵃ are respectively formed in the forwardly extending portions of the arms 26 and in the arms 27. Within each slot 26ᵃ and 27ᵃ is a rod 31 projecting at right angles to its respective arm 26 or 27 and having a threaded inner end over which a wing nut 32 fits, and a co-operating nut 31ᵃ adapted to bear against the opposite side of the respective arm 26 or 27 from the wing nut 32. By this arrangement, the various rods 31 may be secured to the various arms 26 and 27 in various positions, by merely loosening the various wing nuts 32 and moving the rods 31 rearwardly or forwardly in their respective grooves 26ᵃ or 27ᵃ.

A treadle 33 is pivoted at its rear end to a lug 34 depending downwardly from one of the bars 9ᵃ secured to the rear legs 9. A small pair of U-clips 35 are secured to treadle 33 adjacent its central portion and carry a pivot 36 to which various links 37 and 38 are pivoted. The said links 37 project upwardly from pivot 36, are spread apart a greater distance at their upper ends than at their lower ends and are pivotally connected to corner portions of two L-shaped levers 39 pivoted in turn at their forward ends to spaced lugs 8ᵃ projecting downwardly from the front side of the casing 8. The links 38 project upwardly from the pivot 36, are spread apart a greater distance than the links 37 at their upper ends and are respectively connected at their upper ends to the corner portions of two L-shaped levers 40, the said levers being in turn pivoted to downwardly projecting spaced lugs 8ᵇ formed on the rear side of casing 8. The L-shaped levers 39 and 40 have upwardly projecting arms. A bail-shaped grappling hook 41 has a horizontal portion pivoted to the upper ends of the levers 39 and a bail-shaped grappling hook 42 has a horizontal portion pivoted in the upper ends of the L-shaped levers 40. The bail-shaped grappling hook 42 is of greater width than is the grappling hook 41, both of said grappling hooks having hook arms adapted to be engaged with the sides of a tire casing. A notched bar 43 is secured at one end to a front brace bar 9ᵃ and at its other end to a small bar 44 secured to one of the front legs 9, the said bar 43 being so disposed that it will lie closely adjacent one side of the treadle 33, so that the treadle can be engaged with any one of the notches on the bar 43. A tension spring 45 is secured at one end to the pivot 36 and at its other end to the lower end of the supporting arm 14.

Operation.

When it is desired to inspect or operate upon a tire, the device is first put in condition for the reception of the tire. Considering the parts to be positioned as indicated in full lines in Fig. 1 and Fig. 2, lever 21 is grasped and swung to horizontal position, whereupon arm 20 is raised in the slots 18ᵃ above the cylindrical head 18 and the lever 21 is then swung to rearwardly extending position. The arms 27 are then centrally swung so that the rods 31 instead of projecting endwise, project forwardly. A tire casing A may now be placed on the rollers 10, whereupon the two arms 27 will be swung outwardly and the various rods 31 will be adjusted in the various grooves 26ᵃ and 27ᵃ, so that the rods will lie closely adjacent the tire to form supporting guides for the same. The lever 21 is now grasped by the operator and is swung so that the arm 20 will be alined with the groove 18ᵃ in the cylindrical head 18, whereupon the arm is downwardly pressed until the cylindrical rollers 10 will extend into the tire casing between the sides thereof. In this position the plane of the axes of the rollers 25 will be parallel with or coincident with the central radial plane of the tire A. The arm 20 is pressed downwardly until the lower end of the shaft 19 lies closely adjacent the lower inner side of the tire A and in such position that the arm 20 may be swung rearwardly into one of the notches 18ᵇ. The lever 20 is then horizontally held and the arm 20 is swung into engagement with the alined notch 18ᵇ, whereupon the lever 21 is downwardly swung so that the tongue 22 will engage with the notch 18ᶜ formed on the lower edge of the particular alined notch 18ᵇ. While the arm 20 is being swung, the rollers 25 will engage portions of the sides of the tire to spread the same and open up the lower portion of the tire for inspection. After the tongue 22 has been engaged in the notch 18ᶜ, rotation of the shaft 19 will be prevented so that portions of the tire A will continue to be held in spread relation. The crank 13 may now be engaged with the pin 12 on a shaft 11, whereupon the crank may be turned to rotate one of the concave rollers 10 to rotate the tire about its central axis. As the tire is rotated, various portions of the sides of the tire will be successively spread so that the operator can inspect the whole inner surface of the tire casing. Blow-outs or other defects in the tire casing can, accordingly, be quickly found by use of the device.

After a defect has been found in the casing, and when it is desired to operate upon the tire to repair the same or for other purposes, the tire is rotated by rotation of the crank 13 until the portion of the tire to be operated upon is immediately below or closely adjacent to the lower end of shaft 19. The bail hooks 41 and 42 are then swung upwardly and inwardly, whereupon the treadle 33 is stepped on or otherwise pressed downwardly until the hook portions of the hook bails 41 and 42 engage the sides of the tire casing, whereupon the treadle is engaged with one of the notches of the bar 43 to hold the bail hooks 41 and 42 in spread relation. When the treadle 33 is pressed downwardly and secured, the treadle, links 37 and 38, L-shaped levers 39 and 40 and the bail hooks 41 and 42 will assume the position shown in dotted lines in Fig. 2. The lever 21 may now be grasped, swung to horizontal position and the arm 20 moved out of the slot 18ᵇ and raised above the cylindrical head 18, whereupon the lever 21 may be swung to extend rearwardly. By this action the rollers 25 will be removed from the tire casing. To swing the shaft 19 and rollers 25 out of the way of the operator when working on the tire, clamp 17 is released, whereupon the bar 16 is slid rearwardly. Arm 16, cylindrical head 18, shaft 19 and plates 23 and 24 and rollers 25 will now stand at the rear portion of the machine out of the way. The bail hooks 41 and 42 will now hold the tire in spread position so that the same can be readily worked on.

When it is desired to release the tire, the treadle 33 is released from toothed bar 43 and the spring 45 is allowed to act to raise the treadle to upward position. Bail hooks 41 may then be thrown upwardly from the tire, whereupon the tire may be removed from the machine by swinging the arms 27 centrally. By providing the recessed portions in the half-lapped joint portions of the arms 26 and 27 and by inserting the balls 30 in the said recessed portions and providing the small springs 29, the arms 27 will be maintained in position projecting straight forwardly from the upper projecting portions of the arms 26 after being so placed.

The device is very effective in operation and is quite simply constructed in comparison to the heavily constructed tire spreaders now commonly found on the market. The device has been demonstrated in actual practice and has been found to be very efficient for the purposes set forth.

It will, of course, be understood that various changes may be made in the form, details, arrangement and proportions of the various parts without departing from the scope of the present invention.

What is claimed is:

1. A tire spreader having in combination, means for supporting a tire casing, a pair of rollers arranged in V formation and adapted to be inserted in the tire casing between the sides thereof with the axes of said rollers disposed in a plane substantially parallel to the plane of the tire casing and means for turning said rollers so that the same will be disposed in a plane substantially at right angles to the plane of the tire casing to spread the sides of the tire.

2. A tire spreader having in combination, means for supporting a tire casing, a pair of rollers arranged in V formation and adapted to be inserted in the tire casing between the sides thereof with said rollers disposed in a plane substantially parallel to the plane of the tire casing, means for turning said rollers so that the same will be disposed crosswise of the casing to spread portions of the sides thereof and means for rotating the tire casing, whereby said rollers will successively spread all portions of the sides thereof.

3. A tire spreader having in combination, means for supporting a tire, an arm disposed above said means, a shaft carried by said arm depending downwardly therefrom and rotatable therein, rollers supported from said shaft at opposite sides thereof, said rollers being disposed in substantially V formation, said shaft being adapted to be lowered in respect to said arm for insertion of said rollers in a tire casing with the said rollers disposed substantially parallel to the plane of the tire and means for turning said shaft so that said rollers will be disposed in a plane substantially at right angles to the plane of the tire to spread the sides of the tire.

4. The structure defined in claim 3, and means for locking said shaft in the last mentioned position.

5. A tire spreader having in combination, a supporting stand, a concave roller disposed in the central top portion of said stand, and upon which a tire casing is adapted to rest, guides for retaining a tire casing on said roller, a pair of rollers disposed in V formation supported above said first mentioned roller, means for inserting said rollers within a tire casing and for turning the same to extend crosswise of the tire casing to spread portions of the sides thereof and means for rotating said first mentioned roller to rotate the tire and cause successive portions thereof to be spread by said second mentioned rollers.

6. A tire spreader having in combination, supporting means for holding a tire casing, means adapted to be inserted between the sides of a tire casing and turned to spread the tire, grappling hooks adapted to be engaged with the opposite sides of the spread portions of the tire casing, means for spreading said grappling hooks in respect to each other to retain the tire in spread condition and means for removing said insertable means from the tire.

7. A tire spreader having in combination, a platform, a substantially horizontally disposed roller journaled in said platform and upon which a tire casing is adapted to be supported at its bottom side, guides adapted to partially embrace the tire casing at the side edges thereof, a pair of rollers arranged in V formation and adapted to be inserted between the sides of the tire casing adjacent the bottom thereof, means for turning said last mentioned rollers crosswise of the tire casing to spread portions of the sides thereof and means for turning said first mentioned roller to rotate the tire casing.

8. A tire spreader having in combination, means for supporting a tire casing, means adapted to be inserted in the tire casing and turned to spread portions of the sides of the tire casing, a set of grappling hooks for engaging one side of the tire casing after the same has been spread, a set of grappling hooks for engaging the other side of the tire casing after the same has been spread, means for holding said two sets of hooks in spread apart relation and means for removing said insertable means from the tire casing.

9. A tire spreader having in combination, means for supporting a tire casing, means adapted to be inserted within the tire casing and turned to spread portions of the sides of the tire casing, a treadle pivoted to said supporting means, links pivotally secured to said treadle and extending upwardly from said treadle at either side of said supporting means, L-shaped arms pivoted to said supporting means, the upper ends of said links being pivoted to the corner portions of said arms and grappling hooks pivoted to the upper ends of said arms, said hooks being adapted to be engaged with opposite sides of a tire casing after said insertable means have been turned to spread the sides of the tire casing and means with which said treadle is adapted to be engaged to retain the tire casing in spread relation after said treadle has been depressed, said insertable means being removable from the tire casing.

10. A tire spreader having in combination, a stand for supporting a tire casing, a supporting arm secured at its lower end to said stand and extending first rearwardly and then upwardly from said stand, a hollow head formed at the upper end of said arm, a bar fitting within said hollow head and horizontally slidable therein, and means carried by the forward end of said arm and rotatable therein, said means being adapted to be inserted within a tire casing supported by said stand and turned to spread the sides of the tire casing.

11. A tire spreader having in combination, a stand adapted to support a tire casing, a supporting arm secured at its lower end to said stand and extending first rearwardly and then upwardly in respect to said stand, a hollow head formed at the upper end of said arm, a substantially horizontally disposed bar carried in said head and forwardly and rearwardly slidable therein, a hollow cylindrical head formed at the forward end of said bar, said cylindrical head having a vertical slot therein extending from its top downwardly to a short distance from its bottom end, and said cylindrical head also having a plurality of notches formed therein at various levels at one side of and connecting with said vertical slot, a vertically disposed shaft journaled in said cylindrical head and depending downwardly therefrom, a horizontal arm fitting within the slot in said cylindrical head and secured to the upper end of said shaft, said arm being adapted to be raised to various vertical levels in said slot and to be swung laterally from said slot into any one of said notches, a pair of rollers suitably carried at the lower end of said shaft, one at either side thereof, said rollers being disposed in substantially V formation, whereby by raising or lowering said arm connected to the upper end of said shaft, said rollers may be raised from or lowered into a tire casing supported by said stand and whereby by moving said arm into one of said notches said rollers may be turned to spread the sides of the tire casing.

12. The structure defined in claim 11, a lever pivoted to the outer end of said arm secured to the upper end of said shaft, said various notches in said cylindrical head each having a small notched portion therein, said lever having a projecting tongue adjacent its pivoted end for engagement in one of said last mentioned notched portions when said last mentioned arm is swung into one of said first mentioned notches and said lever is downwardly swung, whereby rotation of said shaft will be prevented.

13. A tire spreader having in combination, a stand, a pair of horizontally disposed rollers mounted at the top of said stand for rotation and adapted to support a tire casing, an arm above said stand and at one side thereof, a bar horizontally slidable forwardly and rearwardly in said arm, a vertical shaft carried by said bar and depending downwardly therefrom, said shaft being rotatable in said bar and vertically adjustable therein, a pair of rollers carried adjacent the lower end of said shaft, one of said rollers being disposed at either side of said shaft, said rollers being arranged in V formation, grappling hooks adapted to be engaged with either side of a tire casing supported on said first mentioned rollers and means for spreading said grappling hooks and for retaining said grappling hooks in spread condition, whereby said second mentioned rollers may be inserted within a tire casing and turned to spread the same and said first mentioned rollers may be rotated to revolve said tire casing, whereupon said grappling arms may be engaged with a spread portion of the tire casing to retain the same in spread condition, and said second mentioned rollers may be raised and said second mentioned arm slid rearwardly in said first mentioned arm to move said second mentioned rollers out of the way.

14. A tire spreader having in combination, means for supporting a tire casing, a spreader member of greater length than width, means for moving said member in a direction substantially radial to a tire casing supported by said first mentioned means, to insert said member between the sides of the casing so supported with the length of said member substantially parallel to the general plane of the casing, and means for turning said member when so inserted to dispose the length of said member substantially normal to the plane of the casing and thereby spread the sides of the casing.

15. The structure defined in claim 14, and means for rotating the tire casing respective to said member when its length is disposed normal to the plane of the tire casing to cause successive portions of the casing to be spread.

In testimony whereof I affix my signature.

AUGUST A. GRUNDMARK.